(12) United States Patent
Francois et al.

(10) Patent No.: US 7,864,863 B2
(45) Date of Patent: Jan. 4, 2011

(54) METHOD FOR ENCODING AND/OR DECODING GROUPS OF IMAGES

(75) Inventors: Edouard Francois, Bourg des Comptes (FR); Dominique Thoreau, Cesson Sevigne (FR); Guillaume Boisson, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1443 days.

(21) Appl. No.: 10/558,140

(22) PCT Filed: May 1, 2004

(86) PCT No.: PCT/FR2004/050190

§ 371 (c)(1),
(2), (4) Date: Nov. 22, 2005

(87) PCT Pub. No.: WO2004/107761

PCT Pub. Date: Dec. 9, 2004

(65) Prior Publication Data

US 2006/0233256 A1 Oct. 19, 2006

(30) Foreign Application Priority Data

May 23, 2003 (FR) .................................. 03 06197

(51) Int. Cl.
*H04B 1/66* (2006.01)
*G06K 9/36* (2006.01)

(52) U.S. Cl. .................................. 375/240.19; 382/233

(58) Field of Classification Search ......... 382/232–252; 375/240.02–240.29
See application file for complete search history.

(56) References Cited

U.S. PATENT DOCUMENTS

| 6,549,673 | B1 * | 4/2003 | Ammicht et al. | 382/240 |
| 6,795,504 | B1 * | 9/2004 | Xu et al. | 375/240.19 |
| 2004/0258157 | A1 * | 12/2004 | Xu et al. | 375/240.19 |
| 2007/0133680 | A1 * | 6/2007 | Kimoto | 375/240.12 |

FOREIGN PATENT DOCUMENTS

WO      WO 01/78402      10/2001

OTHER PUBLICATIONS

S-J Choi et al: "Motion-Compensated 3-D Subband Coding of Video", IEEE Transactions of Image Processing, IEEE Inc. New York, US, vol. 8, No. 2, Feb. 1999, pp. 155-167.
Search Report Dated Oct. 8, 2004.

* cited by examiner

*Primary Examiner*—Duy M Dang
(74) *Attorney, Agent, or Firm*—Robert D. Shedd; Paul P. Kiel; Guy H. Eriksen

(57) ABSTRACT

The present invention relates to a method of coding and/or decoding groups of pictures. According to the invention, during the temporal decomposition of a stream of pictures within the framework of 3D wavelet processing, the number of pictures, the choice of the reference picture and the direction of temporal decomposition for each picture sequence of GOP type are adapted in order to minimize the number of unconnected pixels.

15 Claims, 6 Drawing Sheets

METHOD FOR ENCODING AND/OR DECODING GROUPS OF IMAGES

FIELD OF THE INVENTION

The present invention relates to a method of coding and/or decoding groups of pictures.

The invention applies in the context of video compression based on 3D wavelet decomposition.

BACKGROUND OF THE INVENTION

In the state of the art, use has already been proposed of the technique of 3D wavelet picture decomposition in which a group of pictures or GOP is decomposed according to a process which applies a wavelet decomposition to a two-dimensional or 2D picture. On this basis, one then performs a compression of the data stream along the time dimension which plays the role of a third dimension.

In the state of the art, the trickiest point occurs during the wavelet temporal decomposition. When the temporal decomposition has been performed, the pixels that are joined by a motion vector in the GOP picture sequence have been tagged. Now, it is appreciated that pixels through which no motion vector passes are missing when we perform the compression operation along the time dimension.

To solve this problem and avoid losing information during processing, it is therefore necessary to apply a particular processing to these pixels, thereby reducing the efficiency of the wavelet processing.

In the usual video coding schemes, the motion is described by blocks, 16 pixels wide by 16 pixels high, for example. The problem raised above is then shifted to the boundaries of the blocks.

To solve this problem, account has also been taken of the trajectories of the pixels in the two running directions of the picture sequence: in the natural direction of the GOP picture sequence and in the opposite direction. However, one then doubles the quantity of motion information with respect to the conventional techniques.

To afford a remedy to these drawbacks of the state of the art, the present invention consists in choosing configuration data for each sequence and an optimizing criterion making it possible to reduce the number of unconnected pixels in each GOP picture sequence.

It follows that the number of unconnected pixels is considerably reduced without requiring more processing according to a 3D wavelet decomposition.

SUMMARY OF THE INVENTION

Specifically, the present invention relates to a method of coding and/or decoding picture sequences, on the basis of a 3D wavelet processing. The method of the invention comprises a coding phase which comprises:

- a step for determining at least one information item for configuring the 3D wavelet coding as the selection of a reference picture for a sequence of successive pictures, on the basis of a predetermined optimizing criterion; then
- a step for generating a configuration information unit comprising the datum of the reference picture for the said sequence of pictures; and finally
- a step for executing the 3D wavelet coding on the basis of the said configuration information, in such a way as to produce a stream of coded data comprising the union for each sequence of pictures of a configuration information unit and/or of the 3D wavelet coding data for the pictures of the picture sequence.

According to an aspect of the invention, the step for determining at least one configuration information item comprises a step of wavelet decomposition in at least one test picture as reference picture, then a step of motion estimation, then a step of determining the picture of the picture sequence for which the number of unconnected pixels during the motion estimation step is a minimum, as reference picture.

According to an aspect of the invention, the step for determining at least one configuration information item comprises a step of determining the amplitude of the motion in at least one test picture, then a step of determining the picture of the picture sequence for which the amplitude of motion in the picture is a minimum, as reference picture.

According to an aspect of the invention, the step for determining at least one configuration information item comprises a step of determining a texture information item, by measuring the high frequency components, in at least one test picture, then a step of determining the picture of the picture sequence for which the texture information item is the richest, as reference picture.

According to an aspect of the invention, the step for determining at least one configuration information item also comprises the determination of the number of pictures in the said picture sequence.

According to an aspect of the invention, the step for determining at least one configuration information item also comprises the determination of at least one direction of temporal decomposition for a picture sequence.

According to an aspect of the invention, the step for determining at least one configuration information item consists:

- in a first step: in constructing picture sequences GOP of a predetermined size,
- in a second step: for each picture sequence, in selecting the first picture of the picture sequence as reference picture and a direction of temporal decomposition in the forward direction or the last picture of the picture sequence as reference picture and a direction of temporal decomposition in the backward direction according to the choice which minimizes the number of unconnected pixels.

According to an aspect of the invention, the step for determining at least one configuration information item consists:

- in a first step: in constructing a GOP picture sequence of a predetermined size,
- in a second step: in executing the choice of a reference picture, and in that the direction of temporal decomposition is determined in the forward direction for the pictures of the picture sequence which follow the selected reference picture and in the backward direction for the pictures of the picture sequence which precede the selected reference picture.

According to an aspect of the invention, the step for determining at least one configuration information item comprises:

- in the forward direction between pictures: a step of estimating the motion, a step of constructing the trajectories of the motion dots in the forward motion estimation and a step of computing the number of unconnected pixels during the step of constructing the trajectories;
- in the backward direction between pictures: a step of estimating the motion in the backward direction between pictures, a step of constructing the trajectories of the motion dots in the forward motion estimation and a step of computing the number of unconnected pixels during the step of constructing the trajectories;

a step of choosing the best reference picture on the basis of the smallest number of unconnected pixels.

According to an aspect of the invention, the step for determining at least one configuration information item comprises:

a step of estimating the motion in the forward direction between pictures and concurrently with a step of estimating the motion in the backward direction between pictures; then a loop is performed for each picture of the GOP sequence undergoing adaptation in the course of which successively a step of constructing the trajectories is executed, then a step of computing the number of unconnected pixels; then a step of selecting the best reference picture in the GOP picture sequence undergoing adaptation is performed on the basis of the smallest number of unconnected points.

According to an aspect of the invention, the method comprises a decoding phase which consists:

in decoding a configuration information unit determining characteristics of the 3D wavelet coding performed on a given stream of binary data; then in performing an updating of the 3D wavelet decoding processing circuits; and finally in performing the decoding of the stream of binary data representative of a picture sequence so as to produce at output at least one sequence of pictures contained in the given stream of binary data.

According to an aspect of the invention, the method is integrated into a 3D wavelet-based video compressor/decompressor scheme.

According to an aspect of the invention, the method is integrated into an MPEG™ coding/decoding scheme. The selection of a reference picture, on the basis of which is performed the computation of the motion in a GOP, the direction of the temporal decomposition are carried out as a function of the number of pixels connected by this motion, which information may be combined with the motion vector field texture or motion data. The efficiency of the 2D+T wavelet decomposition is improved with the number of temporally connected pixels.

BRIEF DESCRIPTION OF THE DRAWINGS

Other characteristics and advantages of the present invention will become better apparent with the aid of the description and of the appended figures among which.

DETAILED DESCRIPTION INVENTION

Figure 1:
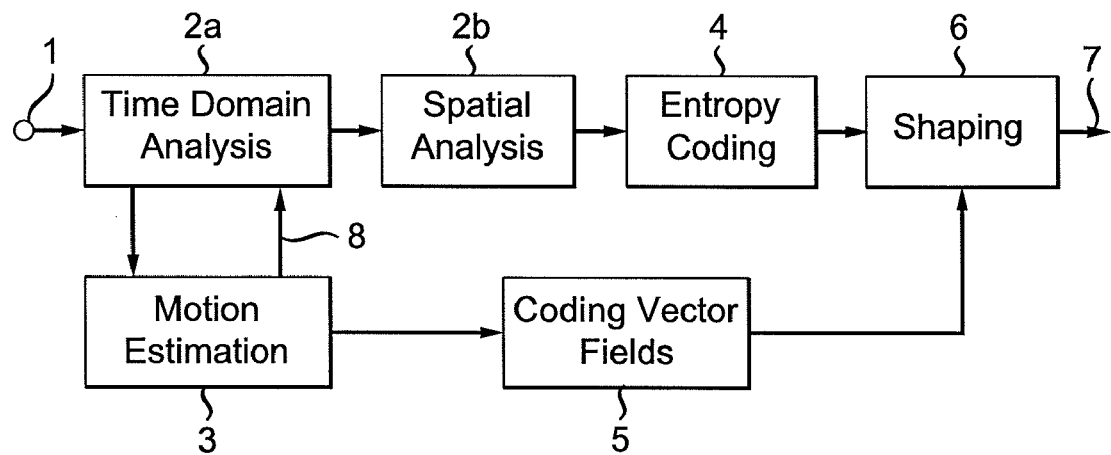
FIGS. 1 to 5 are figures representing the solutions of the state of the art.

Represented in FIG. 1 is an embodiment of a 3D wavelet compression scheme according to the state of the art. It will be noted that this 3D wavelet compression scheme may also be used after the method of the invention has been executed. It will also be noted that what will be described in terms of method, could be implemented in the form of processing blocks in a computer for processing picture sequences.

During a step 1, the acquisition or the synthesis of a sequence of pictures GOP comprising N successive pictures is carried out. The GOP sequence is then transmitted to a wavelet decomposition step 2 and in parallel to a step 3 of estimating the motion between pictures.

The wavelet decomposition step comprises a step 2a of analysis in the time domain and a step 2b of analysis in the space domain (pattern repetition frequencies, etc.).

In practice, in the state of the art, the motion estimation step 3 begins with the choosing of a base picture in the GOP picture sequence which is the last picture of the sequence. Through differences through pictures, between picture_2 and picture_1, then between picture_3 and picture_2, etc., an estimate of the motion is then made. When this motion estimate has been effected, a motion estimation information item is transmitted by a motion estimation information item 8 to step 2a of analysis in the time domain for the wavelet decomposition so as to execute a one-dimensional wavelet decomposition in the direction of the motion.

During this wavelet decomposition, a sequence of transformed pictures corresponding to different temporal frequencies is produced. The sequence of pictures transformed into temporal frequencies is then processed during step 2b of spatial decomposition by a 2D wavelet transform.

At the end of the motion estimation step of step 3 motion coefficients representative of the motion vectors in the GOP picture sequence are transmitted to a step of coding the vector fields representative of the motions in the GOP picture sequence.

At the end of step 2b of spatial analysis, coefficients representative of the spatial frequencies in each picture of the picture sequence are transmitted to an input of an entropy coding circuit.

The entropy coding performed in step 4 comprises two phases: prior modelling and coding proper. The modelling makes it possible to allocate probabilities to each symbol in the data flow to be processed. The coding allocates each symbol a binary word whose length depends on the associated probability. For this purpose, an encoding scheme such as the Huffman code or an arithmetic coding is used.

The coding coefficients arising from the entropy coding 4 are transmitted to a first input of a data stream shaping processing circuit 6, a second input of which receives the components of the motion vector fields arising from step 3. The whole thus constitutes the 3D wavelet coefficient data stream serialized in such a way as to produce a binary data train 7 to which any suitable subsequent processing may be applied, such as an encryption, storage or transmission processing.

Figure 2:
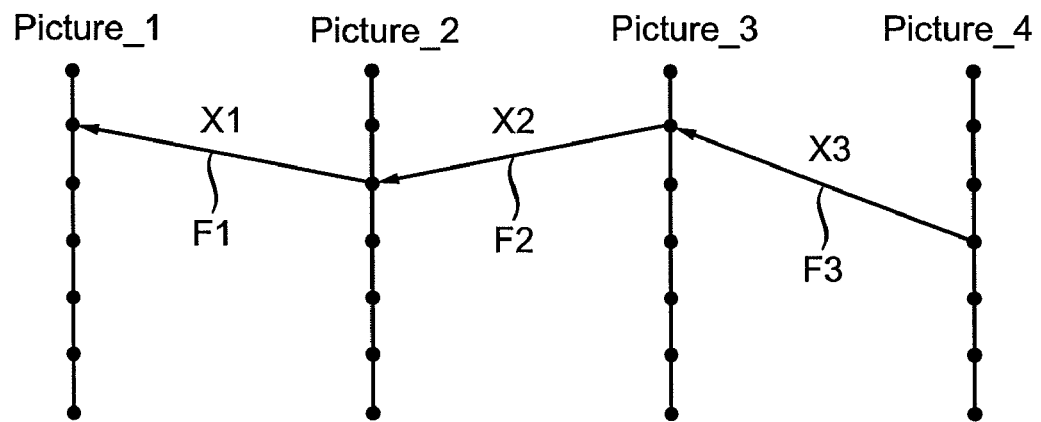

Represented in FIG. 2 is a diagram which illustrates a one-dimensional transformation technique, in the case of a GOP picture sequence of four pictures. The temporal filtering is performed along the trajectory of each point of the base picture which has been chosen during the motion estimation step 3. Each picture referenced in FIG. 2 as picture_1, picture_2, . . . is represented in the serialized form of its pixels which corresponds to the conventional scheme for one-dimensional wavelet transformation. In FIG. 2, the trajectory considered therefore passes through the positions tagged respectively x1 in picture_1, x2 in picture_2, etc. The arrows F1, F2 and F3 represent the successive inter-picture displacements and make it possible to identify the wavelet coefficients corresponding to the trajectory considered for the whole of the GOP picture sequence.

Figure 3:
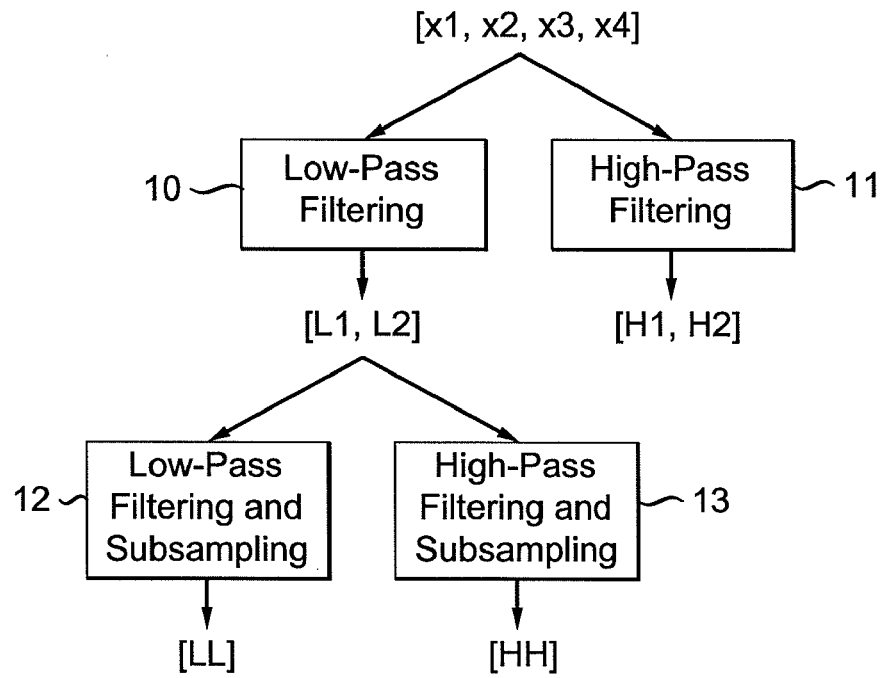

Represented in FIG. 3 is the step of one-dimensional wavelet decomposition alluded to in step 2 of FIG. 1. In this example, we consider a two-level decomposition of a GOP of length 4, with a temporal filtering of length 2. If such a decomposition is applied to the sequence of coefficients [x1, x2, x3, x4], we firstly apply a step 10 of low-pass filtering and a subsampling by 2 which produces a pair of low frequency coefficients [L1, L2]. In parallel, we apply a step 11 of high-pass filtering and a subsampling by 2 which produces a pair of high frequency coefficients [H1, H2].

Then, to the pair of low frequency coefficients [L1, L2], we again apply a step 12 of low-pass filtering and of subsampling by 2 which produces a coefficient [LL] which represents the lowest temporal frequency component and in parallel a step 13 of high-pass filtering and of subsampling by 2 which produces a coefficient [LH] which represents an intermediate frequency component. A batch of four temporal frequency wavelet transformation coefficients [LL, LH, H1, H2] has thus been obtained. Moreover, in most current schemes for 3D wavelet picture compression, the field F2 between pictures 2 and 3 is not estimated, and the filterings 12 and 13 are in fact performed with a field estimated between L1 and L2.

Figure 4:
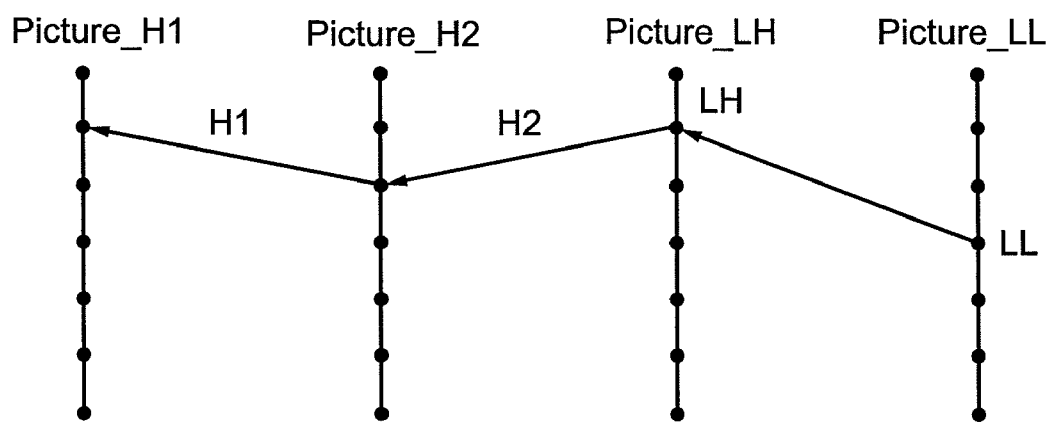

This transformation is performed for every trajectory arising from the reference picture, thereby making it possible to produce pictures transformed into temporal frequencies which are represented in FIG. 4 and which are respectively picture_H1, picture_H2, picture_LH and picture_LL. The four coefficients corresponding to the motion dot tagged in the pictures picture_1, picture_2, ... of FIG. 2 are in the form of their temporal frequency transpositions respectively H1 in picture_H1, H2 in picture_H2, LH in picture_LH and LL in picture_LL. It follows that the trajectory considered is on the time frequency diagram of FIG. 4.

Figure 5:
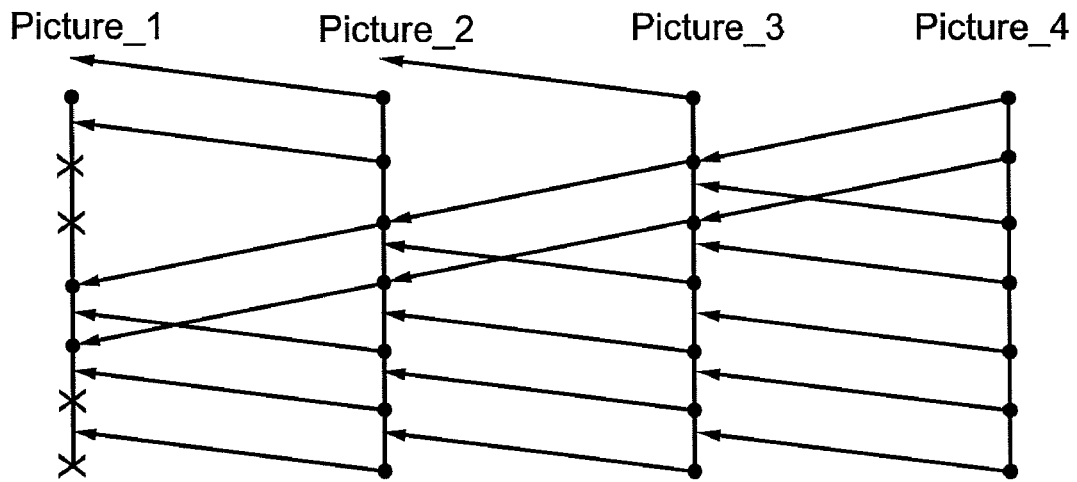

As indicated in the preamble of the present patent application, on completion of the temporal decomposition illustrated in FIG. 4, pixels through which no motion vector passes are not allocated any value in the time frequency domain of FIG. 5. In the state of the art, they are called unconnected pixels. All the other pixels that are assigned to motion vectors are processed correctly. However, in the final transform 8, if no information is added regarding the unconnected pixels marked "X" in the diagram on the left referenced "picture-1" of FIG. 5, where the motion vectors represented which connect the other pixels of the diagrams of the sequence {picture_1, picture_2, picture_3, picture_4} do not reach, the reconstruction of such a sequence will hardly be faithful to the starting GOP picture sequence.

The method of the invention borrows exactly the elements of the state of the art such as it has been defined above. The data stream consists in a stream of "natural" pictures like pictures produced with the aid of a camera, or like pictures produced with the aid of a generator of synthetic pictures. The method of the invention consists chiefly in associating a configuration information unit for the 3D wavelet coding with the data stream described at the output 7 of the conventional coder. The configuration information for the coding ensures an optimal response to a coding scheme cost criterion.

Figure 6:
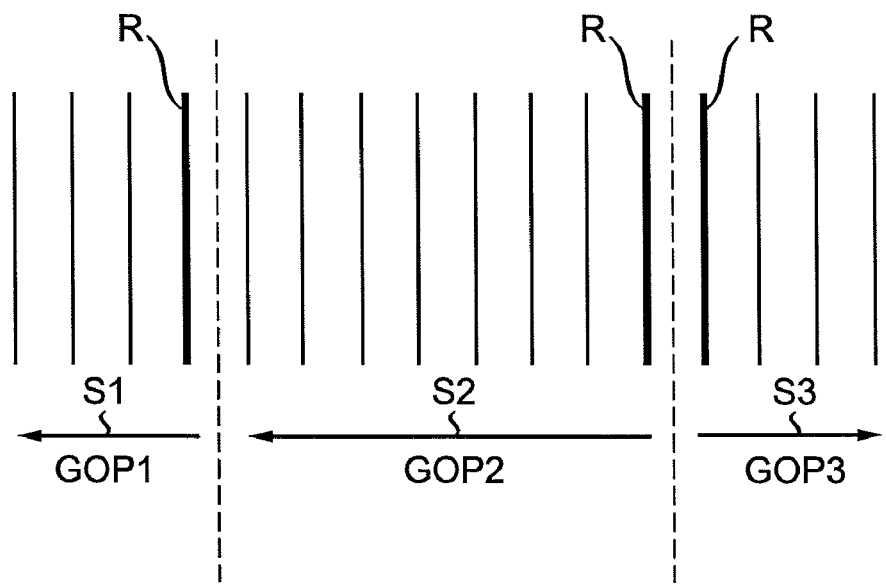
FIGS. 6 to 9 represent the various steps of the method of the invention.
Figure 7:
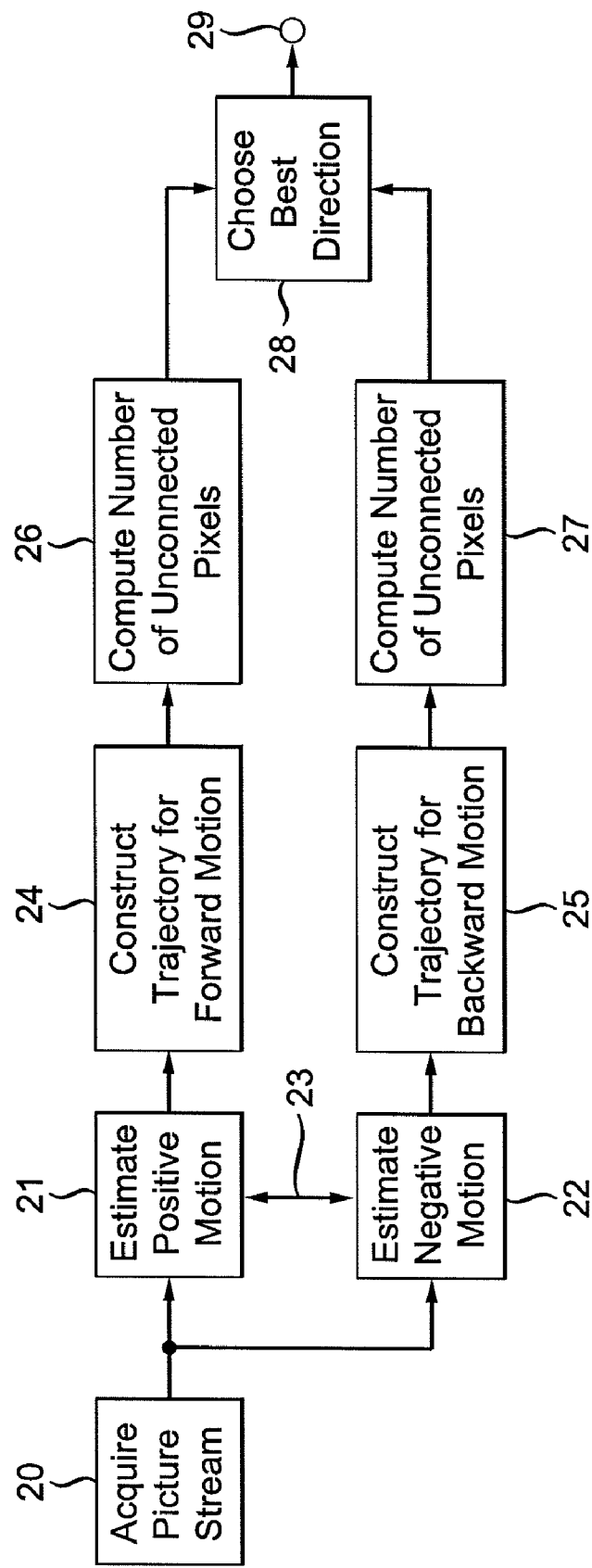
Figure 8:
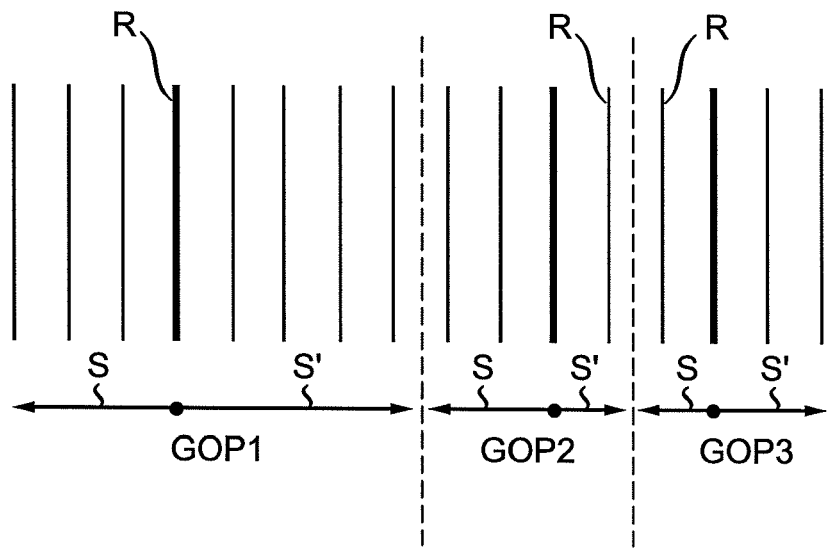
Figure 9:
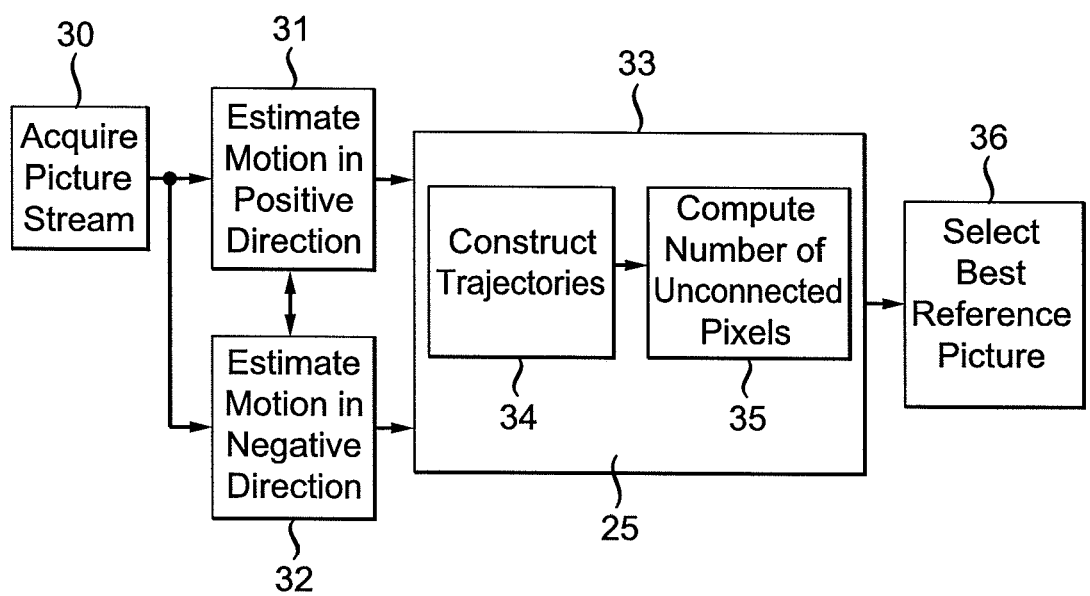

Two modes may be implemented:
the unidirectional mode, or forward/backward mode. In this mode, the direction of the motion compensation must be constant within a GOP. In this mode, only the first and the last picture of the GOP are candidates for the choice of the reference picture
the bidirectional mode, for which all the pictures of the GOP are candidates for the choice of the reference picture. In this mode, both directions of motion compensation can be used on either side of the reference picture. FIGS. 6 and 7 illustrate the unidirectional mode, or "forward/backward" mode; FIGS. 8 and 9 illustrate the bidirectional mode.

Represented in FIG. 6 is the decomposition of a picture stream in the unidirectional mode, where a single direction of compensation is allowed per GOP picture sequence. Each picture is represented in the time domain by a vertical stroke. The picture stream is separated in the temporal sequence of the pictures from left to right into three GOP picture sequences which are successively designated in time by GOP1, GOP2 and GOP3.

According to the invention, the number of pictures of each sequence GOP1, GOP2, GOP3, . . . is related to an upper bound constraint on the number of unconnected pixels per GOP.

According to the invention, the choice of the reference picture R, marked by a bold stroke, is made according to a given criterion. Several examples of criteria are given hereinbelow.

A first criterion is the minimization of the number of unconnected pixels in the GOP. In this case, we compute the number of unconnected pixels in the GOP for each of the two directions of motion compensation. We then choose the direction and the reference picture which minimize the number of unconnected pixels for the whole of the GOP.

A second criterion is the minimization of the amplitude of the motion. In this case, we measure, for each of the two directions the amplitude of the motion in the whole of the GOP, for example by computing the sum of the squares of the components of each motion vector of each field. Then, we choose the direction and the reference picture which exhibits the minimum amplitude of motion.

A third criterion is the richness of information of the reference picture. In this case, we measure the texture information item of the first and of the last picture, by the amplitude of the high frequencies of their respective wavelet decomposition, and we choose the richest as reference picture.

In the example represented in FIG. 6, it is noted that the sequences of pictures in the picture stream are defined in the following manner in the following table:

| Sequence | Size | Reference picture | Direction |
| --- | --- | --- | --- |
| GOP1 | 4 pictures | Last picture | <<backward>> |
| GOP2 | 8 pictures | Last picture | <<backward>> |
| GOP3 | 4 pictures | First picture | <<forward>> |

Represented in FIG. 7 is an embodiment of the method of the invention, in the unidirectional mode, using the minimization of the number of unconnected pixels. The steps identified may each be executed on an identifiable processor or part of an identifiable processor in the form of a circuit for executing the method and an implementation device is derived directly therefrom.

During a step 20, a picture stream is acquired and transmitted to a step 21 of estimation of the motion in the positive direction between pictures and concurrently to a step 22 of estimation of the motion in the negative direction between pictures.

Then, we execute the construction of the trajectories of the motion dots during steps 24 for the forward motion estimation 21 and 25 for the backward motion estimation 22.

Then, we execute the computation of the number of unconnected pixels during a step 26 for the construction of trajectories of step 24 and 27 for the construction of trajectories of step 25.

Finally, we choose the best direction of motion compensation in step 28 to produce in step 29 the binary stream representative of the spatial transform of the GOP picture sequence thus adapted.

The choice of the best direction of motion compensation is made in step 28 through the smallest of the numbers of unconnected pixels recorded in step 26 or in step 27.

It is noted that if the positive direction is detected as minimizing the number of unconnected pixels, the reference picture chosen is the last of the GOP picture sequence undergoing adaptation. Conversely, if the negative direction is detected as minimizing the number of unconnected pixels, the reference picture chosen is the first of the GOP picture sequence undergoing adaptation.

The invention may be widened by allowing all the pictures of the GOP to be candidates for the choice of reference picture. This is the bidirectional mode. Both directions of temporal decomposition may then be adopted for one and the same GOP picture sequence, on either side of the reference picture.

Represented in FIG. 8 is a part of a stream of pictures separated into three GOP picture sequences, which borrow the same codings as those explained with the aid of FIG. 6. But, each GOP sequence comprises one or two directions of decomposition S and S'. When two directions of decomposition S and S' are provided, the reference picture is determined inside the GOP sequence.

In this mode, the choice of the reference picture R may be effected according to the same criteria as in the unidirectional mode, that is to say the minimization of the number of unconnected pixels over the whole of the GOP, the minimization of the amplitude of motion in the whole of the GOP, and the choice of the picture.

Represented in FIG. 9 is an embodiment of the method of the invention in the bidirectional mode, that is to say when all the pictures of the GOP are candidates for the choice of reference picture, with the criterion of minimization of the number of unconnected pixels. Once again, the steps identified may each be executed on an identifiable processor or part of an identifiable processor in the form of a circuit for executing the method and an implementation device is derived directly therefrom.

During a step 30, a picture stream is acquired and transmitted to a step 31 of estimation of the motion in the positive direction between pictures and concurrently to a step 32 of estimation of the motion in the negative direction between pictures.

Then a loop 33 is performed for each picture of the GOP sequence undergoing adaptation in the course of which successively a step 34 of constructing the trajectories is executed, then a step 35 of computing the number of unconnected pixels.

Then, a step of selecting the best reference picture R in the GOP picture sequence undergoing adaptation is performed. In FIG. 9, the criterion for selecting the best reference picture is that of the smallest number of unconnected points.

The method of the invention is integrated into a 3D wavelet video compressor/decompressor scheme. In such an application, the method of the invention is implemented in three distinct places which may be:

a place in which the coding step is implemented;

a place in which the state in which the binary data stream comprising the configuration information unit and the 3D wavelet coding data exists in the form of a transmission signal or a carrier of recorded data; and a place in which the decoding step is implemented.

According to an aspect of the invention, the method is integrated into an MPEG™ coding/decoding scheme. This arrangement is particularly relevant within the framework of the implementation of the MPEG-7 standard.

Figure 10:
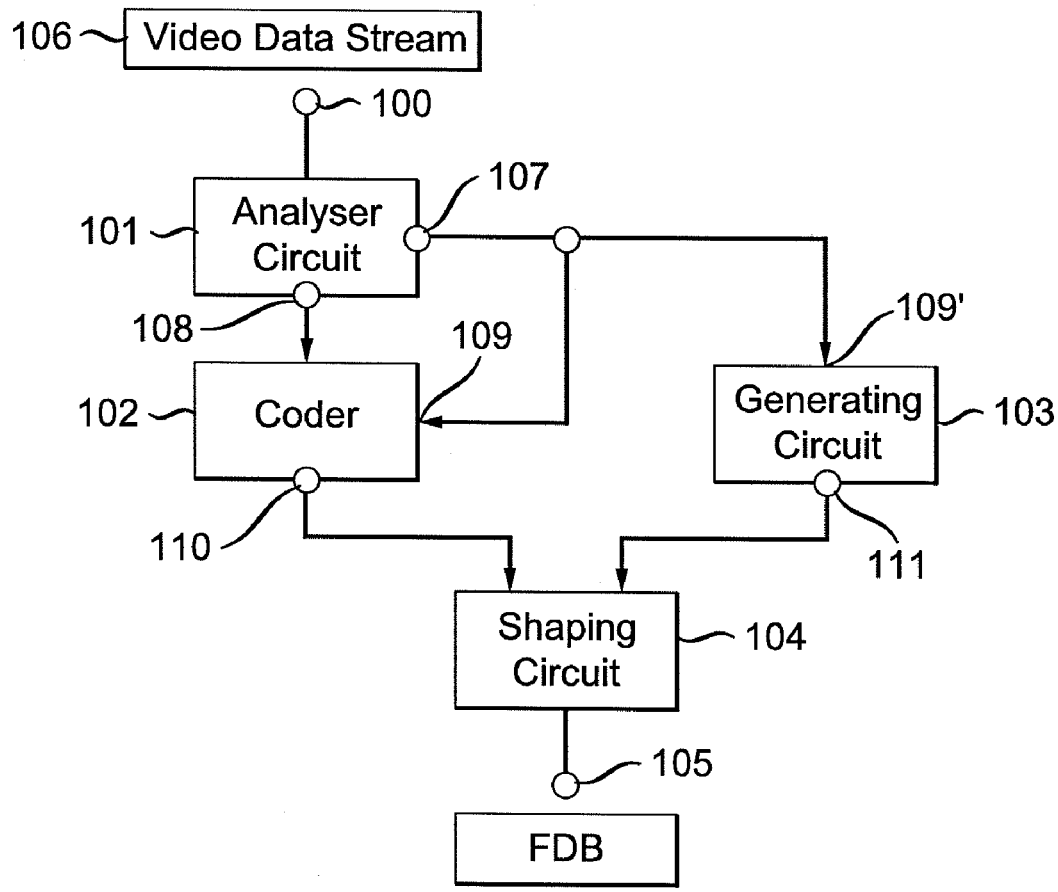
FIGS. 10 and 11 represent particular embodiments of devices implementing the method of the invention.

Represented in FIG. 10 is a block diagram detailing an embodiment of a 3D wavelet coding device implementing the method of the invention.

Such a device comprises an input terminal 100 for a video data stream 106, which is linked to the input of a group of pictures analyser circuit 101, a first output terminal 107 of which is connected to an input terminal 109' of a circuit 103 generating configuration information units for the 3D wavelet coding and to an input terminal 109 of a 3D wavelet coder 102 proper, so as to provide them with the configuration data defining the 3D wavelet processing to be applied, according to the above described method of the invention. The circuit 101 finally comprises a second output terminal for continuing the 3D wavelet processing on the 3D wavelet coder 102 proper.

Output terminals 110 of the coder 102 and 111 of the generating circuit 103 are connected to corresponding inputs of a circuit 104 carrying out a shaping of a binary data stream FDB presented to its output 105 and which comprises according to a determined protocol a sequence:

of a 3D wavelet coding configuration information unit associated with a GOP picture sequence; and of a binary data stream corresponding to the result of the 3D wavelet coding of the corresponding GOP picture sequence.

The data stream thus constructed can be transmitted to a new processing circuit, to a recording device or to a transmission line.

Figure 11:
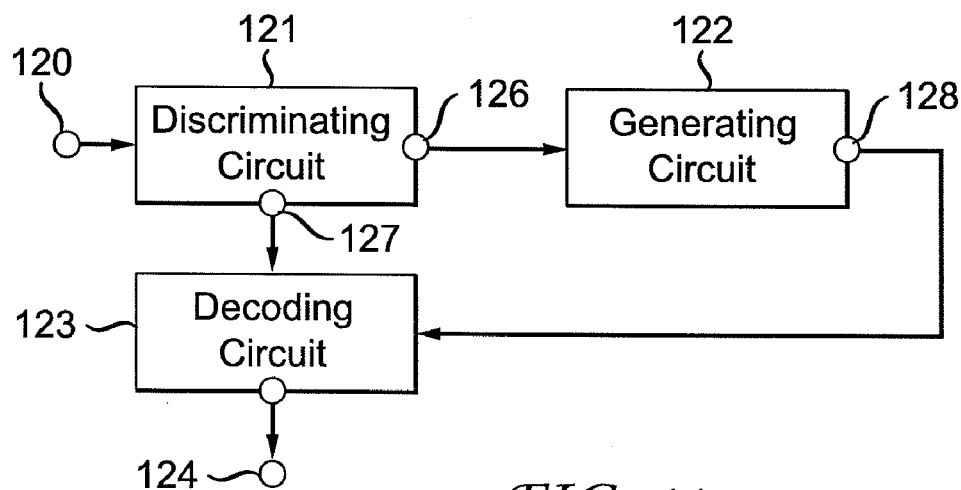

Represented in FIG. 11 is a block diagram detailing an embodiment of a 3D wavelet decoding device implementing the method of the invention.

Such a device comprises an input terminal 120 connected to a discriminating circuit 121 whose output terminals 126 and 127 are respectively connected respectively to a 3D decoding configuration information generating circuit 122 and to a 3D wavelet decoding circuit 123. When the stream of binary data arising from the circuit of FIG. 10 is transmitted to the input terminal 120, the data are analysed by the discriminator 121 so that, on a first output terminal 126 of the discriminator 121, are presented information characteristic of the 3D wavelet coding applied to the binary data stream.

The latter is then presented to the output 127 of the discriminator and loaded into the decoder 123. The latter comprises a configuration input terminal which receives the configuration information arising from a terminal 128 of the circuit generating configuration information 122 on the basis of the information contained in each configuration information unit such as the datum of the reference picture, the direction of decomposition and/or the number of pictures of the picture sequence represented in the data stream 120. The sequence of decoded GOP pictures is present at the output terminal 124.

The present invention finds application in the field of video compression based on 3D wavelet decomposition. It can therefore be integrated into a 3D wavelet-based video compressor/decompressor scheme.

The present invention finds application in a conventional hybrid coding scheme, and particularly in an MPEG type scheme in which the type I pictures and the type P pictures serve as reference pictures. In this case the method of the invention is integrated into an MPEG coding/decoding scheme.

The invention claimed is:

1. Method of coding picture sequences using a coding device, based on a 3D wavelet coding, including a coding phase which comprises:

a step for determining at least one information item for configuring the 3D wavelet coding as a selection of a reference picture for a sequence of successive pictures, based on a predetermined optimizing criterion; then a step for generating a configuration information unit comprising a datum of the reference picture for the said sequence of successive pictures; and finally a step for executing the 3D wavelet coding based on the configuration information to give 3D wavelet coding data, in such a way as to produce a stream of coded data comprising the union for each sequence of pictures of a configuration information unit and of the 3D wavelet coding data for the pictures of the picture sequence.

2. Method according to claim 1, wherein the step for determining at least one configuration information item comprises a step of wavelet decomposition in at least one test picture as reference picture, then a step of motion estimation, then a step of determining the picture of the picture sequence for which the number of unconnected pixels during the motion estimation step is a minimum, as reference picture.

3. Method according to claim 1, wherein the step for determining at least one configuration information item comprises a step of determining the amplitude of the motion in at least one test picture, then a step of determining the picture of the picture sequence for which the amplitude of motion in the picture is a minimum, as reference picture.

4. Method according to claim 1, wherein the step for determining at least one configuration information item comprises a step of determining a texture information item, by measuring the high frequency components, in at least one test picture, then a step of determining the picture of the picture sequence for which the texture information item is the richest, as reference picture.

5. Method according to claim 1, wherein the step for determining at least one configuration information item also comprises the determination of the number of pictures in the said picture sequence.

6. Method according to claim 1, wherein the step for determining at least one configuration information item also comprises the determination of at least one direction of temporal decomposition for a picture sequence.

7. Method according to claim 1, wherein the step for determining at least one configuration information item consists:

in a first step: in constructing picture sequences GOP of a predetermined size, in a second step: for each picture sequence, in selecting the first picture of the picture sequence as reference picture and a direction of temporal decomposition in the forward direction or the last picture of the picture sequence as reference picture and a direction of temporal decomposition in the backward direction according to the choice which minimizes the number of unconnected pixels.

8. Method according to claim 1, wherein the step for determining at least one configuration information item consists:

in a first step: in constructing a GOP picture sequence of a predetermined size, in a second step: in executing the choice of a reference picture, and in that the direction of temporal decomposition is determined in the forward direction for the pictures of the picture sequence which follow the selected reference picture and in the backward direction for the pictures of the picture sequence which precede the selected reference picture.

9. Method according to claim 8, wherein the step for determining at least one configuration information item comprises:

in the forward direction between pictures: a step of estimating the motion, a step of constructing the trajectories of the motion dots in the forward motion estimation and a step of computing the number of unconnected pixels during the step of constructing the trajectories;

in the backward direction between pictures: a step of estimating the motion in the backward direction between pictures, a step of constructing the trajectories of the motion dots in the forward motion estimation and a step of computing the number of unconnected pixels during the step of constructing the trajectories;

a step of choosing the best reference picture on the basis of the smallest number of unconnected pixels.

10. Method according to claim 1, wherein the step for determining at least one configuration information item comprises:

a step of estimating the motion in the forward direction between pictures and concurrently with a step of estimating the motion in the backward direction between pictures; then a loop is performed for each picture of the GOP sequence undergoing adaptation in the course of which successively a step of constructing the trajectories is executed, then a step of computing the number of unconnected pixels; then a step of selecting the best reference picture in the GOP picture sequence undergoing adaptation is performed on the basis of the smallest number of unconnected points.

11. Method of decoding picture sequences coded according to the method of claim 1, using a decoding device comprising a 3D wavelet decoding circuit, comprising a decoding phase which consists:

in decoding a configuration information unit determining characteristics of the 3D wavelet coding performed on a given stream of binary data; then in performing an updating of the 3D wavelet decoding circuit; and finally in performing a decoding of the stream of binary data representative of a picture sequence, using the 3D wavelet decoding circuit, so as to produce at output at least one sequence of pictures contained in the given stream of binary data.

12. Method according to claim 11, integrated into a 3D wavelet-based video decompressor scheme.

13. Method according to claim 11, integrated into an MPEG™ decoding scheme.

14. Method according to claim 1, integrated into a 3D wavelet-based video compressor scheme.

15. Method according to claim 1, integrated into an MPEG™ coding scheme.

* * * * *